(12) United States Patent
Wakatsuki et al.

(10) Patent No.: US 6,169,588 B1
(45) Date of Patent: Jan. 2, 2001

(54) PANEL FOR A COLOR CATHODE RAY TUBE

(75) Inventors: Hiroshi Wakatsuki, Yokohama; Masaki Mizukami, Funabashi, both of (JP)

(73) Assignee: Asahi Glass Company Ltd., Tokyo (JP)

( * ) Notice: Under 35 U.S.C. 154(b), the term of this patent shall be extended for 0 days.

(21) Appl. No.: 09/110,129

(22) Filed: Jul. 6, 1998

(30) Foreign Application Priority Data

Jul. 15, 1997 (JP) .................................................. 9-190218

(51) Int. Cl.$^7$ ...................................................... H04N 5/72
(52) U.S. Cl. ............................ 348/833; 348/818; 348/832
(58) Field of Search ..................................... 348/832, 833, 348/818, 824; 72/53; 606/16; 349/192; 210/500.27; H04N 5/72

(56) References Cited

U.S. PATENT DOCUMENTS

| | | | |
|---|---|---|---|
| 4,054,913 | * 10/1977 | Lerner | 348/822 |
| 4,913,817 | * 4/1990 | Tsushima et al. | 210/500.27 |
| 5,280,374 | * 1/1994 | Nakai et al. | 349/192 |
| 5,300,942 | * 4/1994 | Dolgoff | 348/833 |
| 5,380,318 | * 1/1995 | Daikuzono | 606/16 |
| 5,592,840 | * 1/1997 | Miyasaka | 72/53 |

* cited by examiner

Primary Examiner—Howard Britton
Assistant Examiner—Nhon T Diep
(74) Attorney, Agent, or Firm—Oblon, Spivak, McClelland, Maier & Neustadt, P.C.

(57) ABSTRACT

In a panel for a color cathode ray tube, an at least 10% portion in a width direction of a seal edge surface of the panel is a roughened surface which satisfies:

$$5 \ \mu m \leq R_z \leq 30 \ \mu m,$$

$$150 \ \mu m \leq S_m \leq 500 \ \mu m, \text{ and}$$

$$0.015 \leq R_z/S_m \leq 0.2$$

where $R_z$ represents an average depth of a concave/convex portion formed in the seal edge surface and $S_m$ represents an average period of adjacent concave or convex portions, whereby the production of flaws and the deposition of stains in the seal edge surface is prevented.

6 Claims, 3 Drawing Sheets

PANEL FOR A COLOR CATHODE RAY TUBE

BACKGROUND OF THE INVENTION

1. Field of the Invention

The present invention relates to a glass panel (panel) used for a color cathode ray tube.

Discussion of Background

Glass parts used for a color cathode ray tube are mainly a panel 1 for displaying picture images, a funnel-shaped funnel 2 and a neck 3 as shown in FIG. 5. The panel 1 is sealingly attached to the funnel 2 by interposing a flit glass 5 between opposing seal edge surfaces 4. The flit glass 5 is previously mixed with an organic binder to be in a slurry state, and the flit glass 5 is coated on the seal edge surface of the funnel 2. After drying the flit glass 5, the panel 1 is put on the funnel 2 by mutually opposing the seal edge surfaces. Then, the sealing is conducted by heat-melting the flit glass 5.

The sealing operation to the panel 1 is carried out after a fluorescent layer and an electronically controlling screen which are necessary for displaying a colored picture image are attached to the inside of the hollow portion of the panel. Accordingly, the seal edge surface 4 of the panel is apt to suffer flaws or stains with material having electric conductivity such as carbon powder, iron particles and so on during manufacturing steps, transportation and so on. If the sealing is conducted with the flit glass to the edge seal surface having flaws and/or stains, there may result an electric conductive portion in the sealed portion. In this case, when a high voltage is applied to an inner or outer portion of the cathode ray tube, a predetermined strength or performance may not be assured. Heretofore, a special attention has been paid to the seal edge surface 4 of the panel 1 for a cathode ray tube in order to eliminate the above-mentioned problem.

For example, a seal edge surface in a completely mirror-like state reduces a possibility of attaching thereon stains including material having electric conductivity. Even if the stains are deposited, they can be removed by simply washing. However, there is still a problem that flaws or scratches are easily produced in the seal edge surface.

On the other hand, it is effective to prevent occurrence of flaws by simply forming a roughened surface in the seal edge surface. However, it is difficult to remove stains when they have fallen into recessed portions in the roughened surface. Japanese Examined Patent Publication JP-B-7-95431 proposes a roughened surface formed in a seal edge surface of a funnel. However, the roughened surface is to stably hold the flit glass when the funnel is sealingly attached to the panel. Since the proposed roughened surface has a minute convex/concave portion wherein a period (pitch) of adjacent concave portions (or adjacent convex portions) is small, simple application of the proposed roughened surface to the panel for a cathode ray tube is improper from the viewpoint of removing the stains.

SUMMARY OF THE INVENTION

It is an object of the present invention to provide a panel for a color cathode ray tube which eliminates simultaneously problems of difficulty in removing stains and preventing flaws adversely influencing the performance of the cathode ray tube and which had a seal edge surface capable of constituting a cathode ray tube having stable performance and strength.

The present invention has been attained by finding the facts that: (1) of flaws produced in a seal edge surface of the panel, any flaw which does not traverse the seal edge surface to bridge outer and inner sides of the panel even though it is in a point shape or a linear shape having a certain length, does not substantially influence the strength and performance of the cathode ray tube, and (2) when a toughened surface having a relatively large period between adjacent concave portions (or convex portions) is formed in order to prevent occurrence of a flaw, such roughened surface is effective to prevent stains.

Namely, in accordance with the present invention, there is provided a panel for a color cathode ray tube characterized in that an at least 10% portion in a width direction of a seal edge surface of the panel is a roughened surface which satisfies:

$$5 \, \mu m \leq R_z \leq 30 \, \mu m,$$

$$150 \, \mu m \leq S_m \leq 500 \, \mu m, \text{ and}$$

$$0.015 \leq R_z/S_m \leq 0.2$$

where $R_z$ represents an average depth of a concave/convex portion formed in the seal edge surface and $S_m$ represents an average period of adjacent concave or convex portions.

Further, in accordance with the present invention, there is provided a panel for a color cathode ray tube characterized in that a recessed portion having a roughened surface is formed in the entire circumference of a seal edge surface of the panel, wherein $10 \, \mu m \leq d \leq 200 \, \mu m$ and $d/D \leq 0.06$ where D represents an open-end width in a width direction of the recessed portion and d represents the maximum depth of the recessed portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
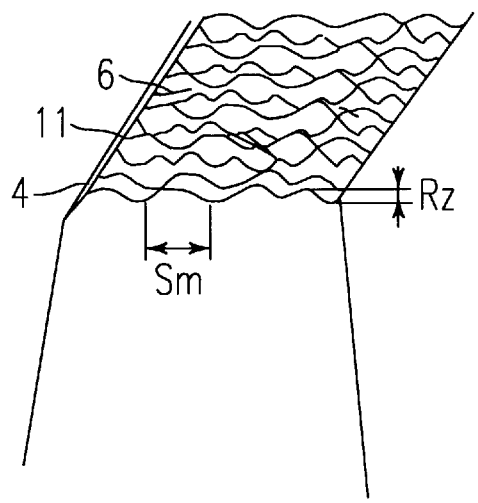
FIG. 1 is an enlarged perspective view partly omitted of a seal edge surface of the panel of a color cathode ray tube in accordance with an embodiment of the present invention.

Generally, the depth of flaws or scratches produced in a seal edge surface of the panel during manufacturing, transportation and so on is $15 \, \mu m$ or less. When such flaws are formed traversing the seal edge surface in its with direction (i.e., traversing from an inner and side to an outer side of the panel), a possibility of partially providing electric conductivity becomes high. Accordingly, the height of surface irregularity (i.e., a concave/convex portion) which interrupts the flaws to make them discontinuous in a width direction of the seal edge surface should be in a range of $R_z$=5–30 $\mu m$, more preferably, 7–20 $\mu m$.

When, $R_z$ is less than 5 μm, effect for making the flaws discontinuous in the width direction is reduced. On the other hand, when $R_z$ exceeds 30 μm, air bubbles produced in the heat-molten frit glass, when the opposing seal edge surfaces of the panel and the funnel are sealingly attached with the frit glass, can not escape and remain therein. The air bubbles in the frit glass may reduce the strength of the cathode ray tube or may result partially an electric conductive portion in the cathode ray tube.

Only the determination of the height of a concave/convex portion in the roughened surface can not solve a problem of removing stains deposited on the seal edge surface. Accordingly, it is necessary to suitably determining an optimum period (pitch) of adjacent concave or convex portions of the concave/convex portion whereby the problem of electric conductivity due to stains can be eliminated. The average period $S_m$ is effective to be in a range of 150–500 μm, more preferably, in a range of 180–400 μm.

When the period $S_m$ is less than 150 μm, it is very difficult to remove stains deposited on concave portions in the concave/convex portion which forms the roughened surface. On the other hand, when $S_m$ exceeds 500 μm, the seal edge surface approaches a mirror surface and effect for making the flaws discontinuous is reduced whereby a predetermined effect can not be expected. The presence of an at least 10% portion of roughened surface in a width direction of the seal edge surface is important in order to stably obtain the effect for preventing flaws which may reduce the strength and the performance of the cathode ray tube.

Further, in order to simultaneously obtain the effect of preventing linear flaws and the effect of preventing deposition of stains, it is effective to form a roughened surface wherein the ratio of the two parameters $R_z/S_m$ is in a range of 0.015–0.2. Desirably, it should be in a range of 0.02–0.13.

The method for forming the roughened surface may be such a method that a predetermined concave/convex portion is formed in a metal mold for forming the panel by mechanically processing, particle blasting or the like so that the concave/convex portion is transferred to the panel when molded. This method is advantageous from the viewpoints of easy manufacture and cost performance. On the other hand, the roughened surface may be formed by a mechanical treatment such as a mechanical processing or a blast processing directly to the molded panel, or the roughened surface may be formed by polishing such as lapping of the seal edge surface of the panel. Although it is possible to form a predetermined concave/convex portion by applying directly to the panel an etching treatment with hydrofluoric acid, nitric acid or the like, the period $S_m$ tends to be small. Accordingly, in order to obtain a predetermined concave/convex portion, it is effective to prolong a treating time or to use a mask.

In the present invention, the measurement of the depths of the concave/convex portion and the flaws in the seal edge surface of the panel is carried out in accordance with JIS B0601 wherein a reference length of 0.8 mm and an evaluation length of 4 mm or more are used to obtain measured values. In this case, a longitudinal magnification and a lateral magnification used for measurement are respectively 2000–10000 times and 10–50 times.

Preferred embodiments of the present invention will be described with reference to the drawings.

Figure 3:
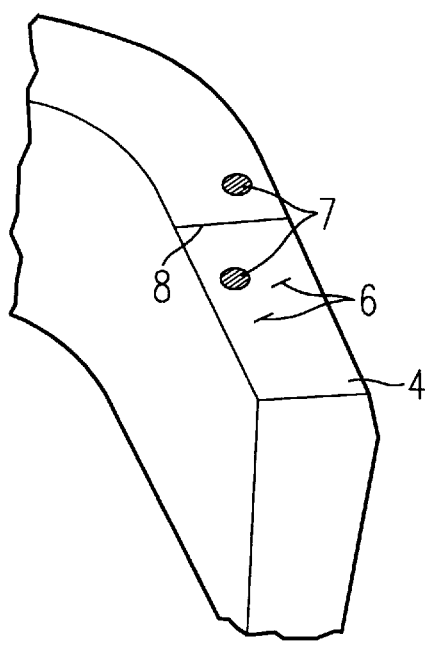
FIG. 3 is an enlarged perspective view partly omitted showing a conventional seal edge surface.

FIG. 3 shows in a perspective view a seal edge surface 4 of a conventional panel. The seal edge surface is polished or processed to have a mirror surface or to be in a state close to a mirror surface. The seal edge surface 4 suffers various flaws or scratches 6 during manufacture or transportation of the cathode ray tube and during a step for imparting a function of displaying a colored picture image on the cathode ray tube. Further, stains 7 such as carbon are sometimes deposited on the seal edge surface 4 even though the mirror-like seal edge surface is not easily stained.

The presence of either or both the flaws 6 and the stains 7 results an electric conductive portion 8 which traverses in a width direction of the seal edge surface to reach from an inner side to an outer side of the panel. In this case, even though there is a smaller possibility of producing an electric conductive portion due to the stains because of its having a mirror surface, flaws are easily resulted. The flaws extending in a width direction of the seal edge surface frequently produce electric conductive portions 8.

Figure 4:
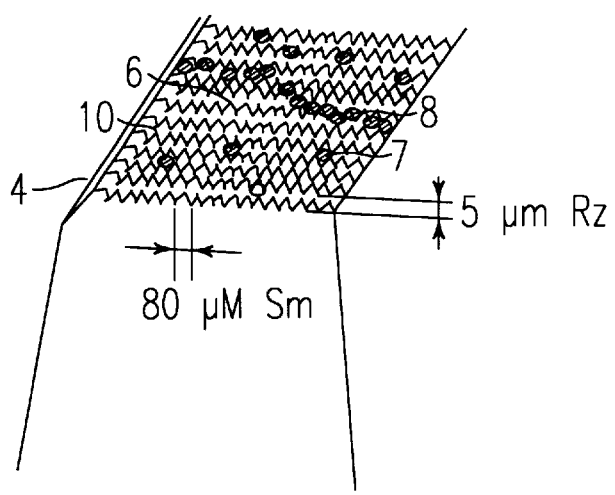
FIG. 4 is an enlarged perspective view partly omitted of a conventional seal edge surface.
Figure 5:
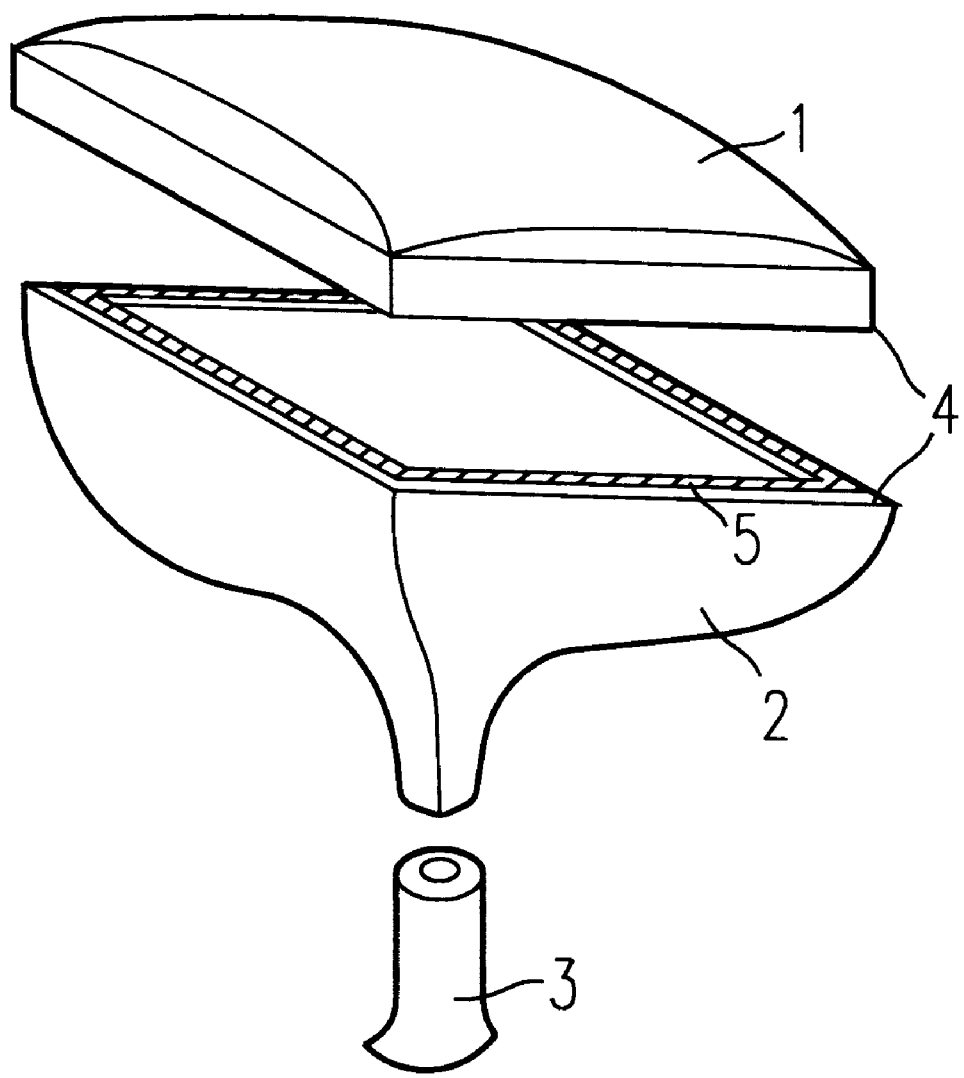
FIG. 5 is a perspective view in an exploded state of a typical glass panel for a color cathode ray tube.

FIG. 4 shows a case that the seal edge surface 4 is formed to have a minutely roughened surface 10 wherein $R_z$=5 μm, average period $S_m$=80 μm and $R_z/S_m$=0.0625, for example. Since $R_z$ is 5 μm or more, flaws are in a discontinuous state in a width direction of the seal edge surface. Accordingly, there is no danger of producing the electric conductive portion 8 unlike the mirror-polished seal edge surface. However, since $S_m$ is less than 150 μm, stains 7 remain in concave portions of the concave/convex portion. If there produce stains extending in a width direction of the seal edge surface, a electric conductive portion 8 is formed.

FIG. 1 shows an embodiment of the present invention in which the formation of an electric conductive portion 8 due to flaws or stains can be prevented. The seal edge surface 4 is a roughened surface wherein a predetermined concave/convex portion is formed. When the seal edge surface is a roughened surface 11 wherein $R_z$=7 μm, $S_m$=200 μm, and $R_z/S_m$=0.035, flaws 6 are discontinuous and there is no danger of deposition of stains. Accordingly, excellent sealing can stably be obtained. Further, when the seal edge surface 4 is first formed as a non-polished surface, and then, the non-polished surface is subjected to a polishing treatment, the mechanical strength of the seal edge surface can further be improved because minute flaws are not produced in the seal edge surface. The roughened surface satisfying the before-mentioned desired conditions prevents the formation of flaws or the deposition of stains whereby excellent strong sealing can be provided.

Figure 2:
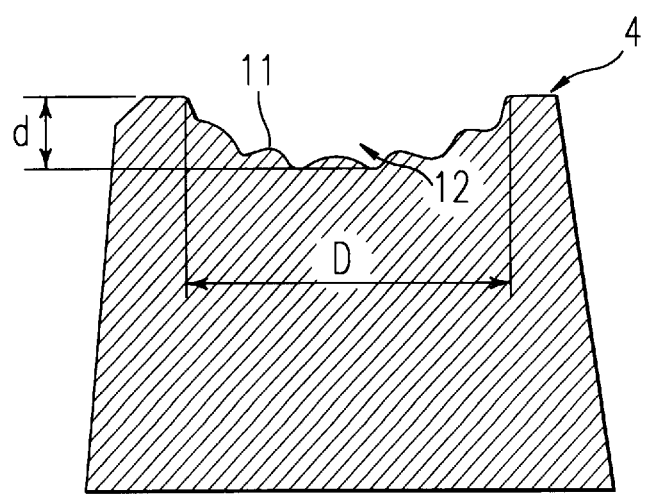
FIG. 2 is an enlarged cross-sectional view of the seal edge surface of the panel in accordance with another embodiment of the present invention.

On the other hand, there is a case that it is unavoidable for the seal edge surface 4 to suffer friction in its width direction by means of a transferring belt conveyor or the like in a transferring step. FIG. 2 is an enlarged cross-sectional view of the seal edge surface of a panel showing an example of preventing the production of flaws caused by friction.

In the panel, a roughened surface 11 is formed in a recessed portion 10 which extends in a circumferential direction of the seal edge surface 4. In this embodiment, the recessed portion 10 is formed in perpendicular to a frictional force applied to a width direction of the seal edge surface 4. Accordingly, even when a flaw is produced in a portion of the seal edge surface, no frictional force reaches the bottom of the recessed portion 12. Accordingly, the production of a flaw which traverses the entire width direction of the seal edge surface can be prevented.

An example of forming a panel having the above-mentioned seal edge surface 4 will be described. A panel is molded so that the seal edge surface 4 has a roughened surface 11 in a recessed shape form, and then, polishing is conducted to the seal edge surface 4 excluding the main portion of the roughened surface 11 whereby the seal edge surface 4 having a polished surface (a flattened surface) and a non-polished surface which is remained as the roughened surface is formed.

If the portion to be polished in the seal edge surface in the above-mentioned panel can be stamp-molded with a sufficient flatness, the portion may be left without polishing. In either case, the recessed portion 12 is extended in the entire circumference at the central portion in a width direction of the seal edge surface. The recessed portion 12 desirably satisfies the conditions of $10 \,\mu m \leq d \leq 200 \,\mu m$ and $d/D \leq 0.06$ where d represents the maximum depth of the recessed portion 12 and D represents an open-end width in a width direction of the seal edge surface.

When d exceeds $200 \,\mu m$, the recessed portion is too deep, so that air bubbles remain in the frit glass to thereby reduce the sealing strength. When d is less than $10 \,\mu m$, effect for preventing the flaws is remarkably reduced. Further, when d/D exceeds 0.06, the shape of the recessed portion becomes imbalanced so that desired sealing can not be obtained. A range of $0.003 \leq d/D \leq 0.03$ is in particular desirable. For instance, a recessed portion 12 having a maximum depth d of about 0.15 mm and an open end width D of about 6 mm is formed in a seal edge surface having a width of 8 mm, d/D=0.025. In this case, a roughened surface in the recessed portion 12 of the seal edge surface 4 should have an average depth of concave/convex portion $R_z$ of 5–30 $\mu m$ and an average period of 150 $\mu m$–500 $\mu m$ wherein $R_z/S_m$ is 0.015–0.2. However, when the recessed portion satisfies $10 \,\mu m \leq d \leq 200 \,\mu m$ and $d/D \leq 0.06$, a desired performance is obtainable even though the seal edge surface 4 satisfies the condition of $R_z < 5 \,\mu m$ or $S_m > 500 \,\mu m$ or $R_z/S_m < 0.015$.

With respect to the seal edge surface of a funnel, there is a smaller possibility that flaws are produced or stains are deposited so that the strength and the electric characteristics of the sealing portion between the panel and the funnel during manufacturing steps to form the cathode ray tube, in comparison with the case of manufacturing the panel. Accordingly, the formation of a roughened surface in the seal edge surface is not always necessary. However, the present invention is applicable to the seal edge surface of the funnel to obtain the same effect.

In accordance with the present invention, a seal edge surface of a panel for a color cathode ray tube has a roughened surface so that the effect for preventing flaws and the effect for preventing the deposition of stains are simultaneously satisfied. Accordingly, the production of an electric conductive portion traversing the entire width of seal edge surface due to the production of flaws or the deposition of stains in the sealing portion between the panel and the funnel can be prevented, and a predetermined mechanical strength and electric strength can stably be provided in the cathode ray tube.

Obviously, numerous modifications and variations of the present invention are possible in light of the above teachings. It is therefore to be understood that within the scope of the appended claims, the invention may be practiced otherwise than as specifically described herein.

What is claimed is:

1. A panel for a color cathode ray tube characterized in that an at least 10% portion in a width direction of a seal edge surface of the panel is a roughened surface which satisfies:

$$5 \,\mu m \leq R_z \leq 30 \,\mu m,$$

$$150 \,\mu m \leq S_m \leq 500 \,\mu m, \text{ and}$$

$$0.015 < R_z/S_m \leq 0.2$$

where $R_z$ represents an average depth of a concave/convex portion formed in the seal edge surface and $S_m$ represents an average period of adjacent concave or convex portions.

2. The panel for a color cathode ray tube according to claim 1, wherein the roughened surface is a surface formed by press-molding.

3. The panel for a color cathode ray tube according to claim 1, wherein $S_m$ is 180–400 $\mu m$.

4. The panel for a color cathode ray tube according to claim 1, wherein $R_z/S_m$ is 0.02–0.13.

5. A panel for a color cathode ray tube characterized in that a recessed portion having a roughened surface is formed in the entire circumference of a seal edge surface of the panel, wherein $10 \,\mu m \leq d \leq 200 \,\mu m$ and $d/D \leq 0.06$ where D represents an open-end width in a width direction of the recessed portion and d represents the maximum depth of the recessed portion.

6. The panel for a color cathode ray tube according to claim 5, wherein d/D is 0.003–0.03.

* * * * *